Sept. 11, 1951          G. C. ERB          2,567,196
CONTAINER WITH COMPRESSIBLE SEALING GASKET AND PRYOFF COVER
Filed Aug. 13, 1947          2 Sheets-Sheet 1
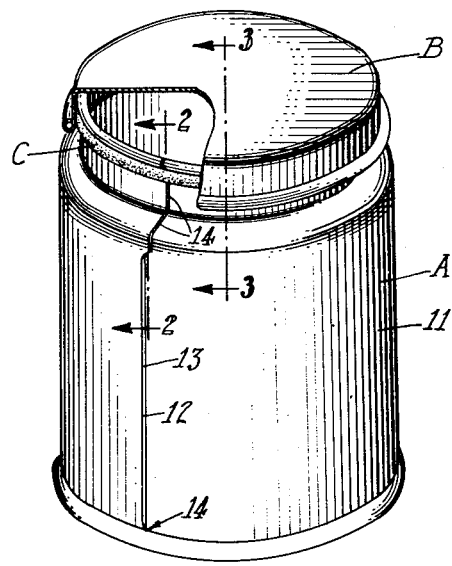
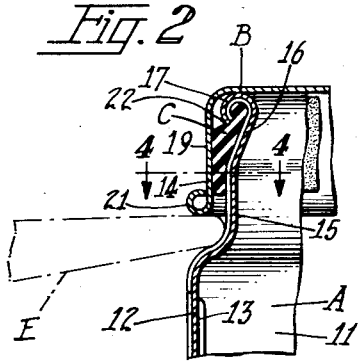
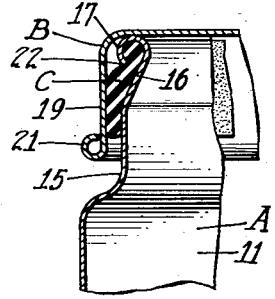
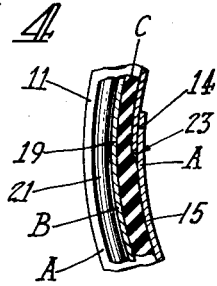
INVENTOR
Geo. C. Erb
BY Ivan D. Thornburgh
Charles H. Erne
ATTORNEYS Sept. 11, 1951 G. C. ERB 2,567,196
CONTAINER WITH COMPRESSIBLE SEALING GASKET AND PRYOFF COVER
Filed Aug. 13, 1947 2 Sheets-Sheet 2
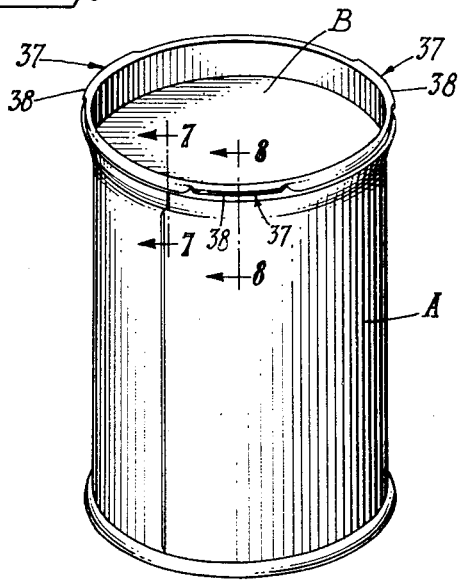
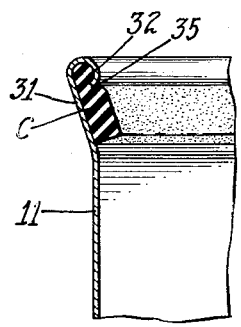
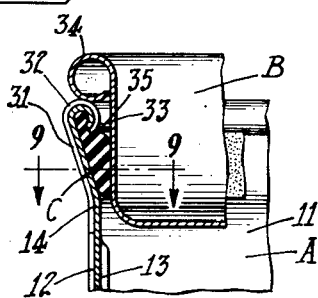
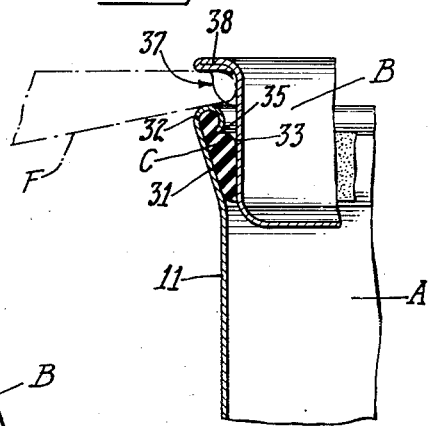
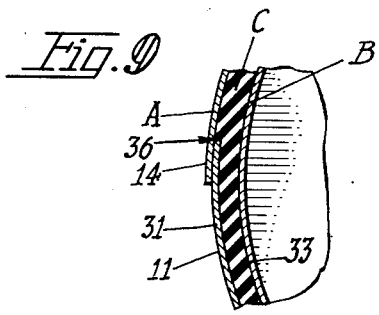
INVENTOR
Geo. C. Erb
BY Ivan D. Thornburgh
Charles H. Erns
ATTORNEYS Patented Sept. 11, 1951

2,567,196

UNITED STATES PATENT OFFICE 2,567,196

CONTAINER WITH COMPRESSIBLE SEALING GASKET AND PRYOFF COVER

George C. Erb, Forest Hills West, N. Y., assignor to American Can Company, New York, N. Y., a corporation of New Jersey Application August 13, 1947, Serial No. 768,348

1 Claim. (Cl. 220—46)

This invention relates to containers or cans for food products and the like and has particular reference to a vacuum holding container having a side seam and having an annular compressible gasket or sealing ring permanently secured to the top edge of the container body with the top edge sealingly embedded in said gasket to provide an hermetic seal for a pryoff cover of the slip or friction plug type.

There are many containers in the prior art that employ the use of a compressible gasket or sealing ring in effecting a hermetic seal between a container body and its cover. In most of these embodiments the container body, the cover or both, are drawn or molded from material such as glass which have smooth continuous surfaces between which the gasket is disposed for effecting a satisfactory seal. Metallic containers of the type which are formed from flat sheet metal blanks and which have their marginal edges joined in longitudinal side seams are difficult to seal despite the fact that the side seams are soldered and carefully wiped and every effort made to fill the spaces or interstices to produce a substantially smooth continuous surface against which the sealing gasket engages.

The instant invention contemplates a simple and relatively inexpensive sheet metal container or can having the usual side seam and closed and sealed hermetically by a reclosure member and an annular compressible gasket or sealing ring interposed between the reclosure member and the body of the can wherein the terminal or peripheral edge of the body is embedded into the sealing ring for permanently securing the ring to the body and for effecting a hermetic seal between the ring and the body regardless of any irregularities in the body side seam or other portions of the engaged surface of the body.

An object of the invention is the provision in a container having a side seam, of a compressible gasket or sealing ring permanently secured to the container body, wherein an hermetic seal is effected between the gasket and the container body regardless of any seam projection or other irregularities in the surface of the body for cooperation with a removable cover for completing the sealing of the container.

Another object of the invention is the provision of such a container, wherein a terminal or peripheral edge of the container is embedded in the compressible gasket for effecting and maintaining a hermetic seal between the gasket and the container body.

Another object is the provision in such a container, of the marginal edge portion at the open top end of the container, formed into a false wire curl for engaging and securing the sealing gasket to the container, wherein the terminal edge of the curl is embedded into the gasket for effecting a hermetic seal between the gasket and the container body, said gasket also functioning as a friction seal for a slip or friction type cover.

Numerous other objects and advantages of the invention will be apparent as it is better understood from the following description, which, taken in connection with the accompanying drawings, discloses a preferred embodiment thereof.

Referring to the drawings:

Figure 1 is a perspective view showing a hermetically sealed slip cover container as one form of the present invention with parts broken away;

Fig. 2 is an enlarged fragmentary section showing the upper portion of the container body along the side seam as indicated by the line 2—2 in Fig. 1;

Fig. 3 is a view similar to Fig. 2 taken substantially along the line 3—3 in Fig. 1 and showing a cover in sealed position on the container body;

Fig. 4 is an enlarged fragmentary sectional detail taken substantially along the line 4—4 in Fig. 2;

Fig. 5 is a view similar to Fig. 1 showing the invention applied to a friction plug type of container;

Fig. 6 is an enlarged fragmentary section showing the upper portion of the container body illustrated in Fig. 5;

Fig. 7 is a view similar to Fig. 6 showing a friction plug cover in sealed position within the container body the view being taken along the side seam as indicated by the line 7—7 in Fig. 5;

Fig. 8 is a view similar to Fig. 7 taken substantially along the line 8—8 in Fig. 5 and showing a portion of the cover compressed to provide a recess for the insertion of a pry-off instrument to facilitate the removal of the cover; and Fig. 9 is an enlarged fragmentary sectional detail taken substantially along the line 9—9 in Fig. 7.

As an exemplary embodiment of the invention, Figs. 1, 2, 3 and 4 of the drawings illustrate one form of a hermetically sealed sheet metal container A having a cooperating removable sheet metal slip cover or closure B and an annular compressible gasket or sealing ring C, the ring being permanently secured to the container and interposed between the latter and the cover to hermetically seal the container and hold a vacuum.

The container A comprises a tubular body 11 formed from a sheet metal blank having its side edges joined in a longitudinal lock and lap side seam 12. A lock portion 13 of the seam is of the conventional form and extends for a major part of the body height. Lap portions 14 of the seam are located adjacent the ends of the lock seam portion at the top and bottom ends of the container. Both the lock portion and the lap portions are soldered in the usual manner for securing the side seam edges together and providing an hermetic joint.

The upper or top marginal portion of the container body 11, in the region of the lap side seam 14 is necked inwardly at 15 so that the outermost extremity of the cover when in sealed position upon the container is located within the outer diameter of the can body to protect the cover against accidental dislodgment. The necked-in portion 15 of the container body adjacent its upper end preferably merges into an inwardly and upwardly tapered wall section 16 which terminates in an outwardly bent false wire curl 17. This wire curl defines and surrounds an open top end or mouth of the container. The lower end of the container body 11 is sealed with a bottom end member D secured to the body in a suitable end seam 18 (Fig. 1).

The container body 11 is closed at its upper end by the slip cover B which overlies the mouth of the container and rests upon the false wire curl 17. Such a cover preferably is of the drawn slip-on type and is formed with a continuous depending imperforate skirt or wall section 19 terminating in an outwardly bent edge or curled rim 21. When the cover is in place on the body, the rim 21 is located adjacent and in spaced relation to the necked-in portion 15 of the body.

The sealing ring C is made of suitable compressible material such as rubber which is capable of hermetically sealing the can when the cover is in closed position upon the container body. The sealing ring C in the present form, surrounds the container body 11 adjacent its mouth. The upper portion of the ring is located within the false wire curl 17 and is secured in place by a terminal or peripheral edge 22 of the curl. This edge firmly engages or grips the sealing ring substantially at right angles to the ring and is embedded therein and thus seals any voids or interstices along the edge 22 and thereby effects a hermetic seal between the gasket and the container body regardless of any irregularities in the outer surface of the body including the side seam.

The lower portion of the ring is free and extends down adjacent the body wall section 16 and outwardly beyond the false wire curl 17 (Fig. 2). The sealing ring C, unlike other sealing elements or gaskets, forms a permanent part of the instant container body, and is retained in hermetic sealing engagement with the curled edge 22 to prevent the ingress of air along the outer surface of the body wall 16 or through any possible opening 23 (Fig. 4) adjoining the side seam.

The inside diameter of the depending skirt 19 of the cover B preferably is larger than the outside diameter of the false wire curl 17 but less than the outside diameter of the sealing ring so that when the cover is forced into sealing position on the container the skirt 19 engages the free or pendent portion of the sealing ring C and presses it against the necked-in body portion 15 of the container. This action compresses and elongates the sealing ring between the surfaces of the cover skirt 19 and the necked-in container body wall. Such deformation of the sealing ring effects an increase in the annular sealing engagement of the cover as it is closed upon the container body, providing a hermetic seal between the cover and the gasket, thereby completing the sealing of the container.

The cover B may be readily placed in sealing position upon the container body 11 by merely applying an axial pressure to the cover. Such a container may be vacuum sealed to protect food products and the like filled therein. The container may be opened easily by means of a blunt pry-open instrument E being inserted into the space between the necked-in portion 15 of the container body and the rim 21 of the cover as shown in Fig. 2 to effect removal of the cover. The cover B thereafter serves as a hermetic reclosure for the container.

As another exemplary embodiment of the invention Figs. 5 to 9 inclusive of the drawings illustrate a modified form of hermetically sealed sheet metal container A having a cooperating removable sheet metal friction plug type closure B and an annular compressible gasket or sealing ring C permanently secured to the mouth of the container and interposed between the latter and the plug closure to hermetically seal the container.

This modified form of container is similar in many respects to the one hereinbefore described, except, that the upper or top marginal portion of the container body in the region of the lap side seam 14 is flared outwardly at 31. The upper or top end of the container body terminates in an inwardly bent false wire curl 32 which defines the mouth of the container and which bites into the compressible sealing ring to provide an hermetic engagement.

The container body is closed at its upper end by the closure B which is inserted into the mouth of the container. Such a closure preferably is formed with a drawn plug section having an upstanding wall section 33 terminating in an outwardly bent edge or curled rim 34. When the closure is in place within the open end of the body, the curled rim 34 of the cover is stopped against the body curl 32.

The sealing ring C (Figs. 6, 7 and 8) borders the mouth of the container body 11 and has an upper portion thereof located within the false wire curl 32 where it is secured in place by a peripheral or terminal edge 35. This edge engages or grips the sealing ring and is embedded into it and thereby hermetically seals any voids or interstices in the curl edge for effecting a hermetic seal between the gasket and the container body regardless of any irregularities on the inner surface of the body including the side seam.

The lower portion of the ring is free and extends down adjacent the flared body wall section 31 and projects inwardly of the false wire curl 32 (Fig. 6). This sealing ring forms a permanent part of the container body, and is retained in sealing engagement with the curl edge 35 to prevent the ingress of air between the embedded edge 35 and the gasket and around the sealing gasket along the inner surface of the body wall 31 or through any possible opening 36 (Fig. 9) at the side seam.

The outside diameter of the upstanding wall section 33 of the closure B preferably is smaller than the inside diameter of the false wire curl 32 but greater than the inside diameter of the sealing ring so that when the closure is placed in sealing position within the container, the wall section 33 engages the free or pendent portion of the sealing ring C and presses it against the flared body portion 31 of the container. This action compresses and elongates the sealing ring between the surfaces of the cover wall section 33 and the flared container body wall. Such deformation of the sealing ring effects an increase in the annular sealing engagement of the cover as it is closed or inserted into the container body, providing a hermetic seal between the drawn plug closure and the gasket, thereby completing the sealing of the container.

The closure B also may be readily placed in sealing position within the mouth of the container body 11 by merely applying an axial pressure to the closure (Figs. 5, 7 and 8). This modified type container may be opened easily by means of a blunt pry-open instrument F being inserted into one of a plurality of slots or recesses 37 (Figs. 5 and 9) formed in the curl of the closure. Slots 37 may be formed by flattening or closing together the walls of the curled rim 34 at spaced sections around the closure thus forming hemmed edges 38 (Fig. 8).

The closure B also serves as a hermetic reclosure for the container following its initial opening. Either the cover or the closure with its respective container as hereinbefore described may be opened and closed repeatedly until the entire contents of the containers have been used without modifying the resealing qualities of the sealing ring C.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A container for food products and the like comprising a tubular container body having a lock and lap side seam, an outwardly bent false wire curl formed in one end of the container body in a lapped region of the said side seam, the double layer thickness of the lap presenting an offset surface in said curl and in the adjacent body wall, a sealing ring of compressible material surrounding said container body in said lapped region, said ring having a marginal edge portion confined within and completely filling the body curl, the terminal edge of said body curl including the offset of the double layer thickness being embedded in said ring and effecting a hermetic seal between the ring and the container body and sealing off the terminal end of any possible opening adjoining the side seam, the body wall adjacent said body curl at the lapped region of the side seam having its offset outer surface also embedded in said compressible sealing ring, and a cover having a continuous imperforate wall section encircling said sealing ring and engaging a pendent portion, said cover imperforate wall compressing said sealing ring between its wall and the container body to embed the offset surface of the body adjacent said body curl for completing the hermetic sealing of the container.

GEORGE C. ERB.

REFERENCES CITED

The following references are of record in the file of this patent:

UNITED STATES PATENTS

| Number | Name | Date |
| --- | --- | --- |
| 979,813 | Westerbeck | Dec. 27, 1910 |
| 1,173,422 | Grannis | Feb. 29, 1916 |
| 1,571,605 | Salles | Feb. 2, 1926 |
| 1,711,176 | Moore | Apr. 30, 1929 |
| 2,130,651 | Phillips | Sept. 20, 1938 |
| 2,339,827 | White | Jan. 25, 1944 |
| 2,364,678 | White | Dec. 12, 1944 |
| 2,428,354 | Blom | Oct. 7, 1947 |